Figure 1:
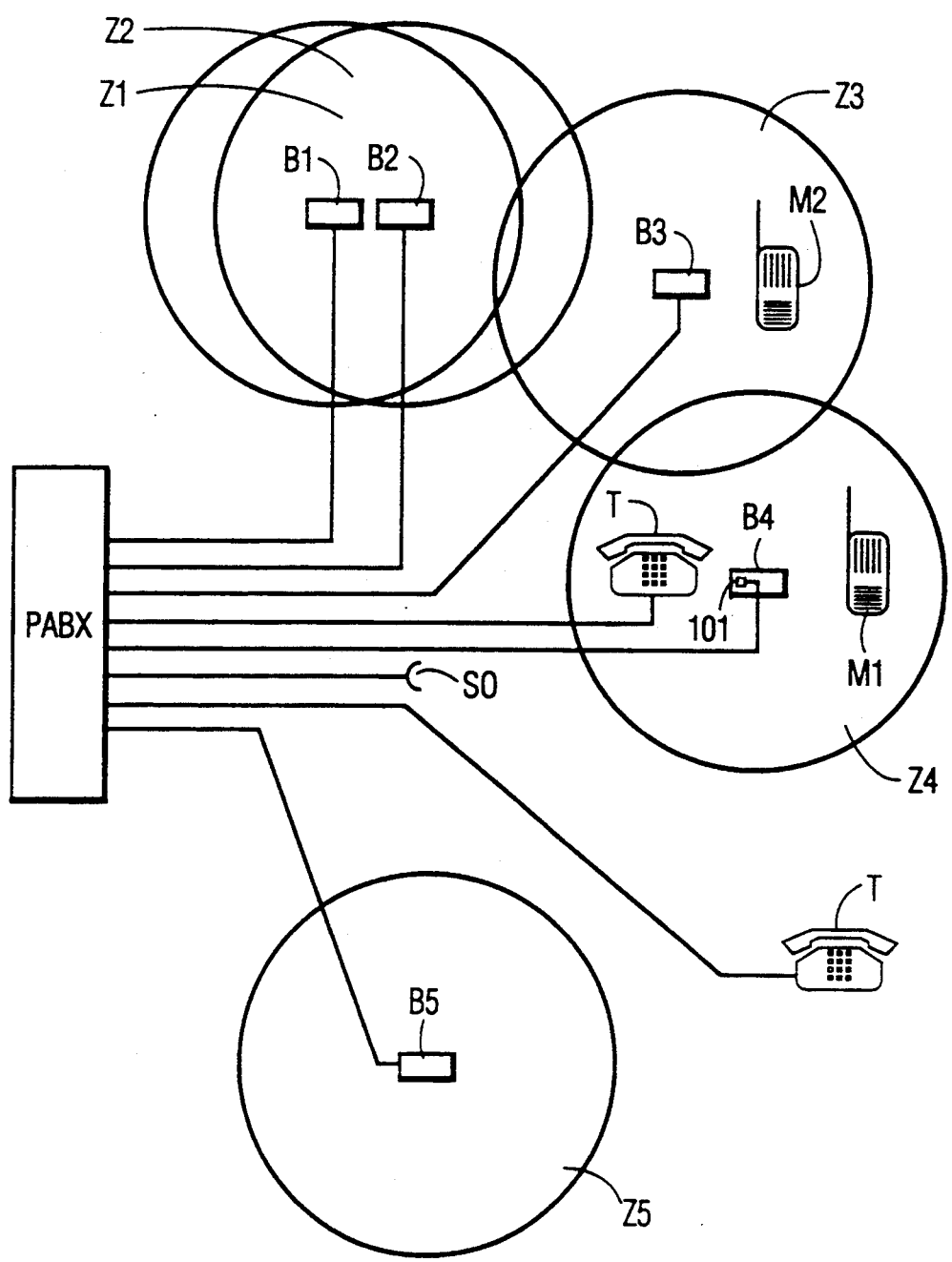

United States Patent [19]

Hoflinger

[11] Patent Number: 5,450,474
[45] Date of Patent: Sep. 12, 1995

[54] NETWORK IN WHICH CORD LESS PHONES ARE PAGED FROM A PLURALITY OF BASE STATIONS THAT RECEIVE PAGING CODES FOR THE CORDLESS PHONES VIA SUBSCRIBER LINES

[75] Inventor: Jürgen Hoflinger, Rötenbach/peg, Germany

[73] Assignee: U.S. Philips Corporation, New York, N.Y.

[21] Appl. No.: 287,051

[22] Filed: Aug. 8, 1994

Related U.S. Application Data

[63] Continuation of Ser. No. 25,299, Mar. 2, 1993, abandoned.

[30] Foreign Application Priority Data

Mar. 11, 1992 [DE] Germany .................. 42 07 748.6

[51] Int. Cl.6 ............................................. H04Q 7/20
[52] U.S. Cl. ................................. 379/61; 379/58
[58] Field of Search .................. 379/58, 59, 60, 61, 379/63; 320/110.1

[56] References Cited

U.S. PATENT DOCUMENTS

| | | | |
|---|---|---|---|
| 4,700,374 | 10/1987 | Bini | 379/60 |
| 5,090,051 | 2/1992 | Muppidi et al. | 379/61 |
| 5,157,660 | 10/1992 | Kuwahara et al. | 370/110.1 |
| 5,226,071 | 7/1993 | Bolliger et al. | 379/60 |

FOREIGN PATENT DOCUMENTS 0293014  11/1988  European Pat. Off. .

*Primary Examiner*—Curtis Kuntz
*Assistant Examiner*—Michael B. Chernoff
*Attorney, Agent, or Firm*—Michael J. Balconi-Lamica; Anne E. Barschall

[57] ABSTRACT

Prior-art radio networks constituted by cordless telephones in which the base stations of cordless telephones are connected to an exchange, comprise a control arrangement connected upstream of the base stations. To considerably reduce the circuitry and cost of a radio network constituted by cordless telephones, there is proposed that the exchange sends out a broadcast call addressed to a multiplicity of subscribers, the broadcast call containing a code assigned to a called cordless telephone and that transmitter means are provided in the base stations which send out a code contained in a broadcast call to the cordless telephones. When the command extension options of exchanges are suitably used, the function of a control arrangement in previous base stations can be integrated in the exchange without additional hardware extensions.

6 Claims, 2 Drawing Sheets

| call nr. | port | feature | code |
|---|---|---|---|
| 2482 | 96 | - | - |
| 2677 | 103 | - | - |
| 2972 | - | CT | 161957~K1 |
| 2982 | 247 | - | - |
| 5800 | 129 | CT | 877931~K2 |

FIG. 2

NETWORK IN WHICH CORDLESS PHONES ARE PAGED FROM A PLURALITY OF BASE STATIONS THAT RECEIVE PAGING CODES FOR THE CORDLESS PHONES VIA SUBSCRIBER LINES

This is a continuation of application Ser. No. 08/025,299, filed on Mar. 2, 1993, now abandoned.

The invention relates to a radio network comprising at least one cordless telephone, in which base stations of cordless telephones are provided for connection to an exchange.

Cordless telephones, unlike mobile radio sets, can be realised with relatively little circuitry and cost. They, together with their associated base stations, can be connected as conventional telephones to, for example, a private branch exchange. In some European countries, however, because of limited available frequencies, the range of such cordless telephones is restricted to 50 to 300 m by a low transmitter power which depends on the ambient radio field. With larger building complexes, for example, business sites and the like, it may therefore happen that the telephone subscriber of a cordless telephone is still inside the building complex or on the business site, but can no longer be reached over his cordless telephone.

EP 0 293 014 has disclosed a radio network comprising cordless telephones, in which adapter units of cordless telephones are combined to groups and thus form a radio cell. A plurality of radio cells is provided and the adapter units of all the radio cells are connected to one common control arrangement. The adapter units and the cordless telephones assigned thereto exchange data, so that a Table of positions may be made up in the control arrangement, which shows the radio cell a specific cordless telephone is in at a specific instant. When there is an incoming call for a specific cordless telephone, a particular radio cell is selected with the aid of the Table of positions, to call the desired subscriber in this radio cell.

Prior-art radio networks comprising cordless telephones thus require quite considerable circuitry and costs for control arrangements and software to manage subscribers equipped with cordless telephones.

It is an object of the present invention to provide a network comprising cordless telephones for which the required circuitry and costs are minimized.

This object is achieved in a radio network as defined in the opening paragraph, in that the exchange is provided for sending a broadcast call addressed to a multiplicity of subscribers, in which the broadcast call contains a code assigned to a called cordless telephone, and in that the base stations comprise means for sending a code contained in a broadcast call to the cordless telephones.

By sending a broadcast call to a multiplicity of telephone subscribers, if the number of possible telephone subscribers is not restricted, even to all the connected subscribers, it is ensured that the broadcast call reaches all the base stations. All the base stations not already handling a call send out the code contained in the broadcast call almost as a selective call. In this manner a specific telephone subscriber of a cordless telephone can certainly be found if he is located in the coverage area of any one of the base stations sending out the code.

The base stations are configured to evaluate broadcast calls received via the interface positioned between exchange and base station and extract a code contained in the broadcast call. This code could also be, for example, the call number predetermined for the cordless telephone. As a result of the sending of this code over a radio channel, the cordless telephones are enabled to compare the codes announced to the base stations by the broadcast call with the individually assigned code of a cordless telephone. In known fashion the cordless telephone which thus recognizes a selective call regarding itself, can react to this call and seize the return channel to the base station concerned.

Simultaneously, the cordless telephone can inform the telephone subscriber of the available call, for example, by means of a tone signal. When the call is taken by the telephone subscriber, the lifting of the receiver of a conventional telephone set is imitated in the base station in known fashion. Informed by the imitated lifting of the receiver, the exchange switches a voice channel through, between a calling subscriber and the called subscriber of the cordless telephone.

Such a radio network comprising cordless telephones is advantageous in that a control arrangement especially provided for switching and managing cordless telephones may be omitted. In the exchange only relatively minor modifications are necessary for producing a broadcast call. Prior-art base stations also require only relatively small modifications so that they can be used in such a radio network comprising cordless telephones. In conventional cordless telephones, no modifications are necessary in the handset itself. In the case where no further additional performance features are provided, no changes need be made in the cordless telephones, whether they are connected as separate sets to a telephone line, or whether they are connected via a base station which, in conjunction with the exchange forms a radio network.

The network option of cordless telephones resulting from the broadcast call of the exchange, however, additionally presents the decisive advantage that the telephone subscribers do not depend on a given network structure. As a result of the broadcast call the administration of the location of the telephone subscribers of cordless telephones with respect to a specific radio cell, may be completely eliminated. The exchange need not even be informed of the terminal to which a base station is connected or from which it is removed.

Without much circuitry or cost the radio network may be enlarged or the position of the radio cells shifted by merely replugging the base station terminals. Costly network planning may be omitted. In principle, each individual telephone subscriber of a cordless telephone can set up base stations according to his own needs at the locations where he customarily spends his time. However, these base stations are then available to all the telephone subscribers of cordless telephones. If, in practice, the place where a telephone subscriber is located should turn out to be in a radio shadow region, i.e. the call density in a specific area is so high that the number of available radio channels usually corresponding to the number of base stations in this radio coverage area is not sufficient, a simple connection of a base station to a nearby available telephone terminal will accordingly enlarge the radio network.

An exchange suitable for a radio network configuration comprising cordless telephones may include in its Table of call numbers a "cordless telephone" feature and a code which can be assigned to a cordless telephone. As a result, the exchange may ascertain, in the case of a call request for a telephone subscriber, whether this subscriber is to be treated as a customary subscriber or whether a broadcast call is to be transmitted to a subscriber carrying the "cordless telephone" feature. In principle, such a radio network can be realised with any exchange which comprises means for exchanging data with the terminal units of telephone subscribers without a voice communication being established.

An especially simple realisation is obtained in ISDN telecommunication systems comprising ISDN interfaces on the subscriber side. In that case, a data channel (D-channel) is provided in addition to two digitized voice channels (B-channels). The data channel may be utilized independently of the voice channel. In such an exchange a broadcast call may be transmitted over all the D-channels by merely modifying the operating control of the exchange, without the need for modifications in the circuitry of the exchange. This is a great advantage in that by merely modifying the operating program, such an exchange may be a radio network comprising cordless telephones.

Only the base stations of the cordless telephones are to be equipped with ISDN interfaces, which can be realised cost-effectively with integrated modules, e.g. FIG. 1 at 101 provided for this purpose. As a result, the cost of evaluating a broadcast call transmitted over the D-channel is reduced. In addition, no separate control arrangements and line circuits specially to be provided for this purpose are necessary for cordless telephones.

The invention will now be further described and explained with reference to the exemplary embodiment shown in the drawing Figures, in which FIG. 1 shows a radio network comprising cordless telephones; and FIG. 2 shows the schedule of call numbers of an exchange for a radio network comprising cordless telephones.

FIG. 1 shows in a diagram an ISDN private branch exchange PABX to which both conventional telephone sets T and base stations B1 . . . B5 of cordless telephones M1, M2 are connected. The base stations B1 . . . B5 of the cordless telephones may be connected to any connecting line leading to the private branch exchange PABX. To the private branch exchange PABX, a base station B of a cordless telephone exhibits the same behaviour as a conventional telephone set T. Depending on the number and spatial distribution of the locations of the base stations, a radio network covering the areas Z1 . . . Z4 may be provided. Alternatively, it is possible to provide isolated radio cells Z5 which correspond, for example, to a central location of the telephone subscriber. The number of base stations and the spatial distribution then depends on the size of the areas to be covered, the traffic density and the radio propagation conditions.

FIG. 2 shows the schedule of call numbers of the ISDN private branch exchange PABX. The first column represents the call numbers of the subscribers connected to the private branch exchange. Ports are assigned to these call numbers in the second column and represent the physical addresses of ISDN connections to which the telephone subscriber whose call number can be dialled is connected. If a telephone subscriber, for example, the subscriber having the call number 2482 calls the number of the subscriber 2982, the operating system of the ISDN private branch exchange PABX will transmit a call number over the data channel of the port 247 in accordance with the call number schedule. When the telephone subscriber having the call number 2982 lifts his handset, this is signalled to the private branch exchange PABX over the D-channel, and the operating system of the private branch exchange PABX realises a communication path between the ports 96 and 247.

Furthermore, the call number schedule has a third column to represent features. Telephone subscribers who can be reached via a cordless telephone, here have the entry CT (cordless telephone). A fourth column "code" is provided for stating the code K1, K2 for each registered cordless telephone. In the exemplary embodiment this code exactly corresponds to the code habitually exchanged between the cordless telephone and the base station for avoiding joined use of a radio channel already used by a cordless telephone. The use of such codes for seizing a radio channel is known to the expert, for example, from DE-OS 39 18 696.2. In the exemplary embodiment cordless telephones are used whose code is issued uniquely when manufactured and is stored in a read-only memory in the cordless telephone. This provides maximum certainty that when an arbitrary cordless telephone is connected, the code of this cordless telephone occurs only once in the entire radio network. When the code CT is to be entered in the call number schedule, this code is to be entered in the "code" column by the attending service person. However, in a preferred embodiment this code may also be sent from the cordless telephone to the exchange as a result of appropriate entries in the cordless telephone itself, and thus a transmission error may be avoided which could not otherwise be precluded with human actions.

If a telephone subscriber can only be reached over his cordless telephone, the column "port" in the call number schedule does not get an entry. On the other hand, if the subscriber can also be reached over a conventional telephone set connected to a specific port, the port number of this telephone set may additionally be entered.

Naturally, the base stations may have the feature of "base station" in the call number schedule and the PABX may send a call only to these base stations. The expansion of the radio network, however, may then be effected only by means of a simultaneous change of the call number schedule.

In the following the handling of a call of the subscriber 2972, who can only be reached over his cordless telephone, will be further described and explained. In the corresponding row of the subscriber 2972 the feature CT for cordless telephone is entered. On the basis of this feature the operating system of the exchange PABX produces a message which is sent out to all the active ports of the exchange over its D-channel as a so-called broadcast message. This message will be referred to as "broadcast message" hereafter on the basis of its function. It contains, in addition to a command codeword which characterizes this message as a broadcast message, also the code K1 of the cordless telephone M1 to be called.

The broadcast message is realised, as are all messages still to be described, by a protocol enlargement which influences the operating system of the exchange.

In the exemplary embodiment, code page 7 in the standardized DCCE protocol for command extensions is used, which permits a purposeful expansion to firm-specific protocols and thus maintains a compatibility with terminal sets of other firms. It is left to the expert in the field of ISDN exchange technology, which of the messages provided by the DCCE protocol, such as register indications message, facility register message, etc., he wishes to use for the necessary messages.

All the base stations not directly completing a call with a cordless telephone, recognize the broadcast message on the basis of the command codeword specific to the broadcast message, and extract from the broadcast message the code K1 contained therein. All the addressed base stations search for an unoccupied radio channel in known fashion and transmit over this radio channel the code K1 extracted from the broadcast message instead of a code stored in the base station.

All the cordless telephones M1, M2, not just completing a call, periodically search the radio channels for detecting an incoming call. The cordless telephone M2, located in the radio cell Z3, dwells on the radio channel that has been seized by the base station B3 for the transmission of a code. Because the cordless telephone M2 evaluates the code K1 transmitted from the base station B3, it recognizes that this code K1 does not correspond to the code K2 stored in the read-only memory of the cordless telephone M2. Subsequently, the cordless telephone M2 continues its search operation.

On the other hand, the cordless telephone M1 in the radio cell Z4 discovers a correspondence between the two codes and subsequently, transmits an acknowledgement signal over the return channel. On the basis of this acknowledgement signal the base station B4 produces an acknowledgement message which is sent to the central control unit of the exchange PABX over the D-channel. When the acknowledgement message is returned, peripheral controls of the exchange assign to the acknowledgement message the number of the port through which the acknowledgement message returns. Once the acknowledgement message has arrived at the exchange PABX, the transmission of the broadcast call is stopped by the transmission of a broadcast message "end of broadcast call" especially provided for this purpose, because the location area of the called cordless telephone is now known. The broadcast signal is only sent out through the port of the base station B4.

Once the called subscriber accepts the call, for example, by depressing a call acceptance key on the cordless telephone M1, a hook switch signal is sent to the base station B4. The base station B4 produces a set-up message which is sent over the D-channel to the exchange PABX. On the basis of this message the exchange PABX switches through the voice channel between the calling subscriber and the base station B4. From now on the base station B4 acts as a base station of a customary cordless telephone and thus makes voice communication possible between the calling and called subscribers.

I claim:

1. Radio network comprising:
   a) an exchange for producing a call, which call contains a code assigned to a called cordless telephone,
   b) a plurality of subscriber lines, all coupled to receive the call at the same time,
   c) a plurality of cordless telephones, and
   d) a plurality of telephone base stations, the base stations each being coupled to receive the call containing the code from the exchange via the subscriber lines, each base station having a respective range and including respective means for broadcasting the code throughout the respective range and therefore to those of the cordless telephones which are within the respective range, a respective one of the base stations thus establishing the call with the called cordless telephone when the called cordless telephone is within one of the respective ranges, so that the establishing occurs without the exchange knowing, prior to the establishment of the call, where the called cordless telephone is located and without need for a wide area paging transmitter.

2. Radio network as claimed in claim 1, characterized in that the base stations comprise routing means for routing a control information signal to the exchange when an acknowledgement message from the called cordless telephone is received.

3. A telephone exchange comprising:
   a) a plurality of telephones including at least one cordless telephone, a plurality of base stations, and at least one non-cordless telephone, each of the plurality of base stations having a respective range;
   b) call number table means for storing:
      i) a cordless telephone indication for the at least one cordless telephone;
      ii) a code assigned to the cordless telephone indication;
      iii) information about the at least one non-cordless telephone; and
   c) subscriber lines for:
      i) supplying the code at the same time to each of the plurality of base stations attached to the subscriber lines;
      ii) coupling with a called cordless telephone via one of the plurality of base stations, which one locates the called cordless telephone within a respective range, so that the calling occurs without need for a wide area paging transmitter and without the exchange knowing, prior to the calling, the location of the called cordless telephone; and
      iii) communicating with the called cordless telephone.

4. The exchange of claim 3
   wherein the call number table means stores a table including a plurality of telephone extension numbers, each extension number being associated with a port number or the cordless telephone indication or both.

5. The exchange of claim 4, wherein at least one of the plurality of base stations includes an ISDN interface.

6. A method of operating a PABX which communicates with a plurality of cordless telephones, the method comprising the steps of:
   transmitting a code, indicating a called subscriber, via each of a plurality of subscriber lines to a plurality of base stations at the same time, each base station having a respective range;
   broadcasting the code from each of the plurality of base stations to the respective ranges and therefore to those of the plurality of cordless telephones which are within the respective ranges;
   reaching one of the cordless telephones, identified by the code, via one of the base stations, which contains the one cordless telephone within its respective range, so that the reaching occurs without need for a wide area paging transmitter and without the exchange knowing, prior to the reaching, the location of the one cordless telephone.

* * * * *